No. 774,164. PATENTED NOV. 8, 1904.
S. S. ELDER.
ANIMAL TRAP.
APPLICATION FILED MAR. 26, 1904.
NO MODEL.

Witnesses.
Emma Sharp
Arthur M. Fitzgerald

Inventor.
Samuel S. Elder.
By Atty N. DuBois.

No. 774,164.

Patented November 8, 1904.

UNITED STATES PATENT OFFICE.

SAMUEL S. ELDER, OF SPRINGFIELD, ILLINOIS.

ANIMAL-TRAP.

SPECIFICATION forming part of Letters Patent No. 774,164, dated November 8, 1904.

Application filed March 26, 1904. Serial No. 200,125. (No model.)

*To all whom it may concern:*

Be it known that I, SAMUEL S. ELDER, a citizen of the United States, residing at Springfield, in the county of Sangamon and State of Illinois, have invented certain new and useful Improvements in Animal-Traps, of which the following is such a full, clear, and exact description as will enable others skilled in the art to which it appertains to make and use my said invention.

My invention relates to traps of that class which employ a cage having an opening provided with a tilting platform.

The purposes of my invention are to provide a cage of improved construction, said cage having an inlet-opening provided with guards and an outlet-door provided with a securing device; to provide an oscillative door of improved construction; to provide a tilting platform connected to operate said door, and to provide within the cage guards and a curtain to prevent exit of the animal.

With these ends in view my invention consists in the novel features of construction and combinations of parts shown in the annexed drawings, to which reference is hereby made, and hereinafter particularly described, and finally recited in the claims.

Figure 1:
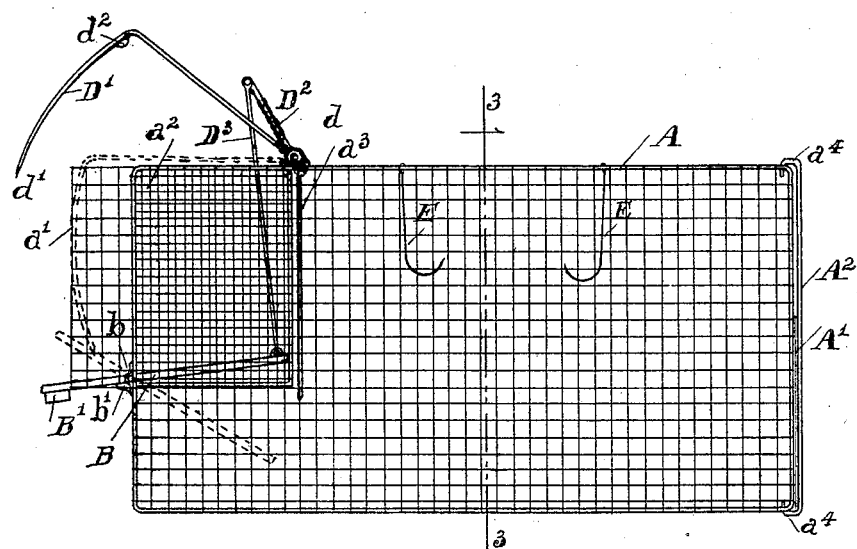
Figure 2:
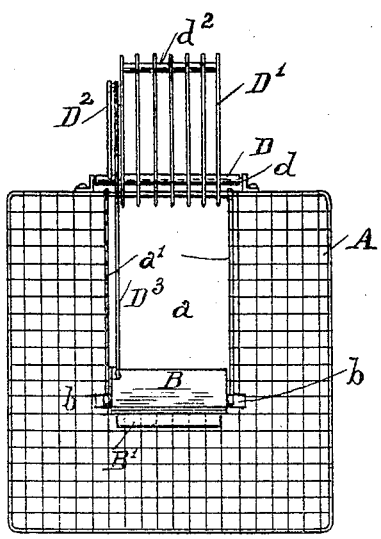
Figure 3:
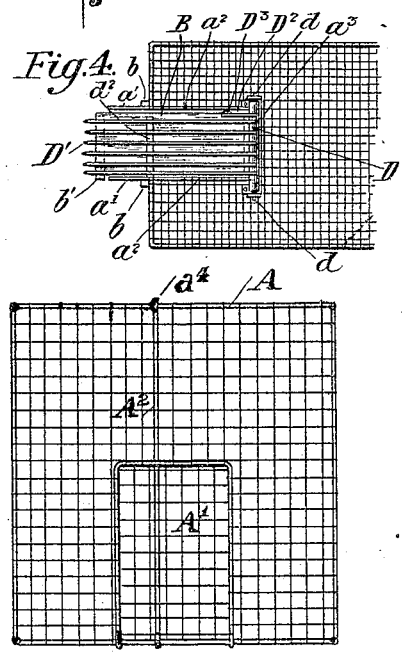

Referring to the drawings, Figure 1 is a side elevation of the trap. Fig. 2 is a front end elevation. Fig. 3 is a partial vertical section on the line 3 3 of Fig. 1; and Fig. 4 is a top plan, on a reduced scale, of the forward portion of the trap.

Similar reference characters designate like parts in the several views.

The rectangular cage A is preferably made of meshed-wire fabric; but any other suitable material may be used. At one end of the cage is an inlet-opening $a$. On the outside of the cage two stationary vertical guards $a'$ are secured, one along each side of the opening $a$. In constructing the cage the guards $a'$ are preferably formed by slitting the meshed fabric of the front end of the cage horizontally along the upper and lower edges and vertically along the central line of the inlet-opening and then bending the two parts thus formed outward until they assume a vertical position at right angles to the end of the cage and parallel to the edges of the tilting platform—one on each side of the platform. On the inside of the cage are vertical guards $a^2$, secured on the top and on the front end of the cage and extending below the under side of the tilting platform when the inner end of the platform occupies its highest position.

A swinging metallic curtain $a^3$ is suspended from the top of the cage and extends across the space between the guards $a^2$ and downward below the inner end of the tilting platform, so as to close the space between the guards and prevent the animal from again mounting the platform after it has once entered the cage.

A platform B oscillates in suitable supports $b$ on the end of the cage and extends through the opening $a$ into the space closed by the curtain $a^3$ and the guards $a^2$. A weight B' at the outer end of the platform causes the outer end of the platform B to slightly overbalance its inner end, so that the inner end of the platform is normally higher than the outer end. A stop $b'$ on the under side of the platform engages with the end wall of the cage and prevents excessive downward movement of the outer end of the platform.

A transverse shaft D is mounted to oscillate in suitable bearings $d$ on top of the cage. A series of downwardly-curved parallel rods D', having sharpened lower ends $d'$, are secured on the shaft D and are connected by a stay $d^2$, and the rods D' form a door which when depressed closes the opening $a$. An upwardly-extending arm $D^2$ is secured on the shaft D. A rod $D^3$ connects the arm $D^2$ with the inner end of the platform B.

At the rear end of the cage is a door A'. A rod $A^2$, having at each end a hook $a^4$, hooks into the meshes of the fabric of the top and bottom of the cage and keeps the door closed.

Bait-hooks E are suspended from the top of the cage.

In practical use bait is placed on the hooks E. Attracted by the bait the animal mounts the tilting platform B and proceeds inward thereon until the platform tilts and dumps him into the cage. Simultaneously with the tilting of the platform B the arms D' descend and close the opening $a$ behind the animal.

If the animal attempts to back out, the sharpened points of the rod D' will stick him and cause him to move forward. When the animal is once within the cage, the curtain $a^3$ and the guards $a^2$ prevent him from again mounting the platform and escaping through the opening $a$. To remove the animal from the cage it is only necessary to detach the rod $A^2$, when the door A' may be opened.

Having fully described my invention, what I claim as new, and desire to secure by Letters Patent, is—

1. In an animal-trap, a cage of meshed fabric having an inlet-opening, vertical guards inside of said cage and alongside of said opening, a swinging curtain extending across the space between said last-named guards, a platform mounted to oscillate in said opening, and an oscillating shaft connected with said platform and carrying a number of downwardly-curved arms adapted to close said opening, as set forth.

2. In an animal-trap, the combination of a rectangular cage of meshed fabric, a door mounted on one end of said cage, and a rod having at each end a hook engaging in the meshes of the fabric of the cage and retaining the door in its closed position, as set forth.

3. In an animal-trap, the combination of a cage having an inlet-opening, guards, and a swinging curtain; with a downwardly-oscillative door mounted on top of said cage, a tilting platform mounted in said inlet-opening, means for limiting downward movement of the outer end of the tilting platform, and means for connecting the tilting platform with the oscillating door, as set forth.

4. A cage for animal-traps, having an inlet-opening and having on each side of said opening integral guards formed from the material cut and turned outward to produce said opening, as set forth.

In witness whereof I have hereunto subscribed my name, at Springfield, Illinois, this 24th day of March, 1904.

SAMUEL S. ELDER.

Witnesses:
  EMMA SHARP,
  MARGARET McDONALD.